(12) United States Patent
Rode

(10) Patent No.: US 6,970,904 B1
(45) Date of Patent: Nov. 29, 2005

(54) METHODS AND APPARATUS FOR SHARING COMPUTATIONAL RESOURCES

(75) Inventor: Christian Stig Rode, Waltham, MA (US)

(73) Assignee: Rode Consulting, Inc., Waltham, MA (US)

( * ) Notice: Subject to any disclaimer, the term of this patent is extended or adjusted under 35 U.S.C. 154(b) by 680 days.

(21) Appl. No.: 09/756,157

(22) Filed: Jan. 6, 2001

Related U.S. Application Data

(60) Provisional application No. 60/174,697, filed on Jan. 6, 2000, and provisional application No. 60/173,604, filed on Dec. 29, 1999.

(51) Int. Cl.[7] .............................................. G06F 15/16
(52) U.S. Cl. ....................... 709/203; 709/200; 709/219; 709/225; 709/226; 709/227; 709/229; 709/201; 718/104
(58) Field of Search ................................. 709/203, 227, 709/229, 226, 200, 219, 205, 201; 718/104

(56) References Cited

U.S. PATENT DOCUMENTS

| | | | | |
|---|---|---|---|---|
| 5,715,314 A | * | 2/1998 | Payne et al. ................... 705/78 |
| 5,745,681 A | * | 4/1998 | Levine et al. ................ 709/200 |
| 5,826,242 A | * | 10/1998 | Montulli ....................... 705/27 |
| 5,961,601 A | * | 10/1999 | Iyengar ....................... 709/229 |
| 5,991,802 A | * | 11/1999 | Allard et al. ............... 709/219 |
| 6,049,877 A | | 4/2000 | White | |
| 6,205,479 B1 | * | 3/2001 | Dulai et al. .................. 709/225 |
| 6,225,995 B1 | * | 5/2001 | Jacobs et al. ................ 715/738 |
| 6,324,568 B1 | * | 11/2001 | Diec ........................... 709/203 |

OTHER PUBLICATIONS

Feldmann et al, "Performance of Web proxy caching in heterogeneous bandwidth environments", Mar. 1999, Proceedings IEEE vol. 1, pp. 107–116.*

Kemmerer, R. "Security issues in distributed software", Nov. 1997, ACM SIGSOFT Software Engineering Notes, Proceedings of the 6th European conference, vol. 22 issue 6.*

Bouvin, N. "Unifying strategies for Web augmentation", Feb. 1999, Proceedings of the 10th ACM conference on Hypertext and hypermedia: returning to our diverse roots.*

* cited by examiner

*Primary Examiner*—Anthony Knight
*Assistant Examiner*—Thomas Pham

(57) ABSTRACT

Systems, methods and computer media instructions are disclosed that enable the storage or caching of server account information by a client application, such as a web browser with the ability to store "cookies". The account information is used to control access to server resources. Server methods update, then verify client-stored account information before beginning an operation and optionally credit the account for cancelled or failed operations. The account is preferably stored encrypted or obfuscated to prevent user modification. Additional methods are disclosed for the use of a "sampling" database and/or log comparison to deter abuse of these systems, methods and instructions.

8 Claims, 7 Drawing Sheets

METHODS AND APPARATUS FOR SHARING COMPUTATIONAL RESOURCES

CROSS REFERENCE TO RELATED APPLICATIONS

Not Applicable (Provisional Applications Filing: 60/173,604 Filing date: Dec. 29, 1999 and 60/174,697 Filing date: Jan. 6, 2000)

STATEMENT REGARDING FEDERALLY SPONSORED RESEARCH OR DEVELOPMENT

Not Applicable

REFERENCE TO A MICROFICHE APPENDIX

A computer listing, 17 pages in length is attached in paper form. A microfiche version will be submitted within 10 days.

BACKGROUND OF THE INVENTION

1. Field of the Invention

This present invention relates to the field of client-server communications and more specifically to regulating use of a server by a client or clients.

2. Description of Prior Art

Servers attached to a public data network such as the internet are capable of providing to Clients dynamically computed or selected data in addition to static graphics and textual material. Servers are a limited resource and their owners and managers often desire to limit or apportion their use among Clients.

A common mechanism is to require that each User of a Client be associated with a User ID which is mapped to a Client-User Account which has associated limits on resource utilization. Association with the Account may be established by Client-User submission of an identifier and password, or by other means such as completing a registration form, or clicking on a personalized link in an email, or simply using the Client-User's unique internet email address. The account information is usually kept in a database or file associated with the Server and not under control of the Client. This scheme has the following limitations.

1. Additional disk and CPU resources are required to maintain a User Account Database.
2. The User Account Database may become a performance bottleneck, particularly when multiple Servers are added to support a number of Clients, or when the Servers are geographically distributed or otherwise remote from the User Account Database.

As an alternative, User Account information can be stored in the Client (Client Storage). However, even if this account information is encrypted or obfuscated to inhibit manual editing, a User may be able to prevent it from being updated and so prevent the account information from accurately reflecting resource use.

Additional problems are created when Server resources are publicly usable (as is the case with a web server available on the public internet) or semi-publicly usable (as is the case with a web server attached to a corporate WAN or internet with large numbers of users). Without some kind of unforgeable identifier, resource management is easily evaded.

The following books/documents provide relevant background and are incorporated by reference:

"CGI Programming on the World Wide Web", Shishir Gundavaram, © 1996 O'Reilly & Associales, Inc.

"The Essential Client/Server Survival Guide, Second Edition", Orfali, Harkey and Edwards, © 1996 John Wiley and Sons "Programming Perl", Larry Wall & Randal L Schwartz, © 1991 O'Reilly & Associates, Inc. and $2^{nd}$ edition, Larry Wall, Tom Christiansen & Randal L. Schwartz, © 1996 O'Reilly & Associates, Inc.

"Java in a Nutshell, A Desktop Quick Reference for Java Programmers", David Flanagan, © 1996 O'Reilly & Associates, Inc. and $2^{nd}$ edition © 1997 O'Reilly & Associates, Inc.

"HTML: The Definitive Guide", Musciano & Kennedy, © 1996 O'Reilly & Associates, Inc.

"JavaScript: The Definitive Guide, $2^{nd}$ edition", David Flanagan, © 1996–7 O'Reilly & Associates, Inc.

"Dynamic HTML: The Definitive Reference", Danny Goodman, © 1998 O'Reilly & Associates, Inc.

RFC 1945 (HTTP 1.0)/2048 (HTTP 1.1)/etc., IETF (Internet Engineering Task Force)

RFC 1866 (HTML 2.0), IETF

HTML 3.2 and 4.0, W3C (World-Wide Web Consortium)

Perl MD5 library

As used in this document, the following words with capitalized first letters have special meanings:

A Computer includes any number and organization (cluster, array, etc.) of CPUs, memory/storage/communication devices, etc. and whose function includes the processing of information.

A Client is a Computer that is capable of accepting input from and providing output to a User. A Client may also be a Server.

A Server is a Computer that provides computational, data storage, communication or other services for at least one (and usually more than one) Client. A Server may also be a Client.

A User is an individual or process in control of an application or process executing on a Client (Client-User).

One Client can have multiple Users.

A Network includes all proxy servers, gateways, routers, communication channels, cabling, etc. that comprise a communication medium between two Computers, such as a private, local network or a public network such as the internet.

A Unique Identifier is a token (a collection of letters, digits and other symbols) that with high probability (>99%) is uniquely associated with a single User. For example, a uniformly-chosen 64-bit random number is considered a Unique Identifier for the purposes of this definition, because the probability is very small (<1%) that two users could be assigned the same number. A Unique identifier does not necessarily contain or point to personal information about the user, i.e., an anonymous user can be assigned a Unique Identifier.

A Browser is a Client program that at least a) accepts data in the form of a display list (e.g. HTML, XML, etc.) and b) wherein at least one of the interpretable display list elements is a "hyperlink" having the capability to "link" to display list data on Servers other than (and in addition to) that which provide the list containing the link. c) uses an intrinsically stateless, file-oriented protocol (e.g. HTTP, FTP, etc.) to retrieve objects named in the display list (e.g. GIF, JPG). Typical Browsers have many other capabilities in addition to these. The words "link" and "hyperlink" are standard terms of art within the field of HTML, HTTP and the WWW.

Form Structure Data are those elements of a fetched Browser display list (e.g. <FORM> tag and associated elements) that create corresponding form elements in which data can be entered and submitted to a Server (such submitted data is Form Data)

Related inventions: Montulli, Pat. No. 5,774,670 and White Pat. No. 6,049,877.

BRIEF SUMMARY OF THE INVENTION

Systems, methods and computer media instructions are disclosed that enable the storage or caching of server account information on a client by clients that have a mechanism for the storage and modification of named or enumerated server data. An example of such an application and mechanism would be a web browser with the ability to store "cookies". Another example might be a web browser with the ability to install public-key encryption certificates (or both cookies and certificates). A less common example might be a graphical browser coupled with a second application that can save data at server instigation, such as an FTP server. The account information is used to limit user access to server resources. Storing account information on the client implies it need not be stored on the server (or, in some cases, that a smaller "auditing" database be used), thereby conserving server resources and scaling more easily to a multi-server system.

The account information may be stored on the client in an encrypted or obfuscated form to discourage user modification. To process a server operation subject to account limitations, the server first reads and validates the existing account information from the client, then updates it with an (worst-case) estimate of the resources to be used. It again reads and validates the updated account information to verify the account information was successfully updated. If this second verification is successful AND the verified updated account information indicates completion of the operation will not exceed usage limits the operation is performed. The account information may be checked against limits before the cookie is updated. Optionally, failed or cancelled operations can credit the user account. To prevent reuse of the account information, a timestamp may be updated along with account information and server operations not performed unless the timestamp indicates the account information has been freshly updated. The mechanism may be thought of as "pay in advance".

Though the methods of the previous paragraph are highly inconvenient for a user to circumvent, they can be circumvented. Consequently, additional methods are disclosed for the optional use of a "sampling" database and/or for periodic multi-server usage log comparison to deter abuse of these systems, methods and instructions.

Further methods are disclosed for initializing The account information in such a way that is time-consuming and/or inconvenient so that a user cannot just delete the stored account information and start over. A simple delay is demonstrated, in conjunction with the (optional) presentation of a disclaimer. A registration form requiring significant data entry or even a quiz would be obvious alternatives to the preferred embodiment and within the scope of the attached claims.

It is therefore an object of the present invention to store information about Client-User use of Server resources on the Client (in Client Storage) so to be accessible to a single or multiplicity of Servers without requiring a central database.

It is a further object of the present invention to provide methods that use Client Storage in a manner that helps ensure the said Client-User usage information is up-to-date.

It is a still further object of the present invention to encode said Client-User usage information in such a manner that it cannot be forged or easily reused by the client.

It is still further object of the invention to disclose optional methods of auditing (sampling).Client-User usage information to help thwart sophisticated attacks on the integrity of the foregoing methods.

BRIEF DESCRIPTION OF THE DRAWINGS

FIG. 0A Preferred Embodiment: Minimal Configuration (Single Server) A single client is in communication with a single (web) server that performs both web transactions and any computations.

FIG. 0B Internet Server combined with one or more Private Computation Servers A single client is in communication with a single (web) server. This primary server has one or more subsidiary servers that can be used to offload the primary server of computationally intensive tasks. Communication between the primary server and it's subsidiaries need necessarily use the same protocols and formats of the communication between client and primary server. In particular, the primary server may reformat the results from the subsidiary servers for presentation to the client.

FIG. 0C Internet Server combined with one or more Client-visible Computation Servers, Method Set C A single client is at first in communication with a primary server that forwards the request to a computation server. This computation server is responsible for validating the requested operation against Client-User account information and for formatting completed and error results for use in the Client-User application.

FIG. 0D Internet Server combined with one or more Client-visible Computation Servers, Method Set D A single client is at first in communication with a primary server that validates the requested operation against Client-User account information and forwards successful requests to a computation server. This computation server is responsible for formatting results for use in the Client-User application, but not for checking the account information.

The following are examples of a User Interface purely for the purposes of concrete illustration of how the described methods and systems might be presented to a User.

Figure 1:
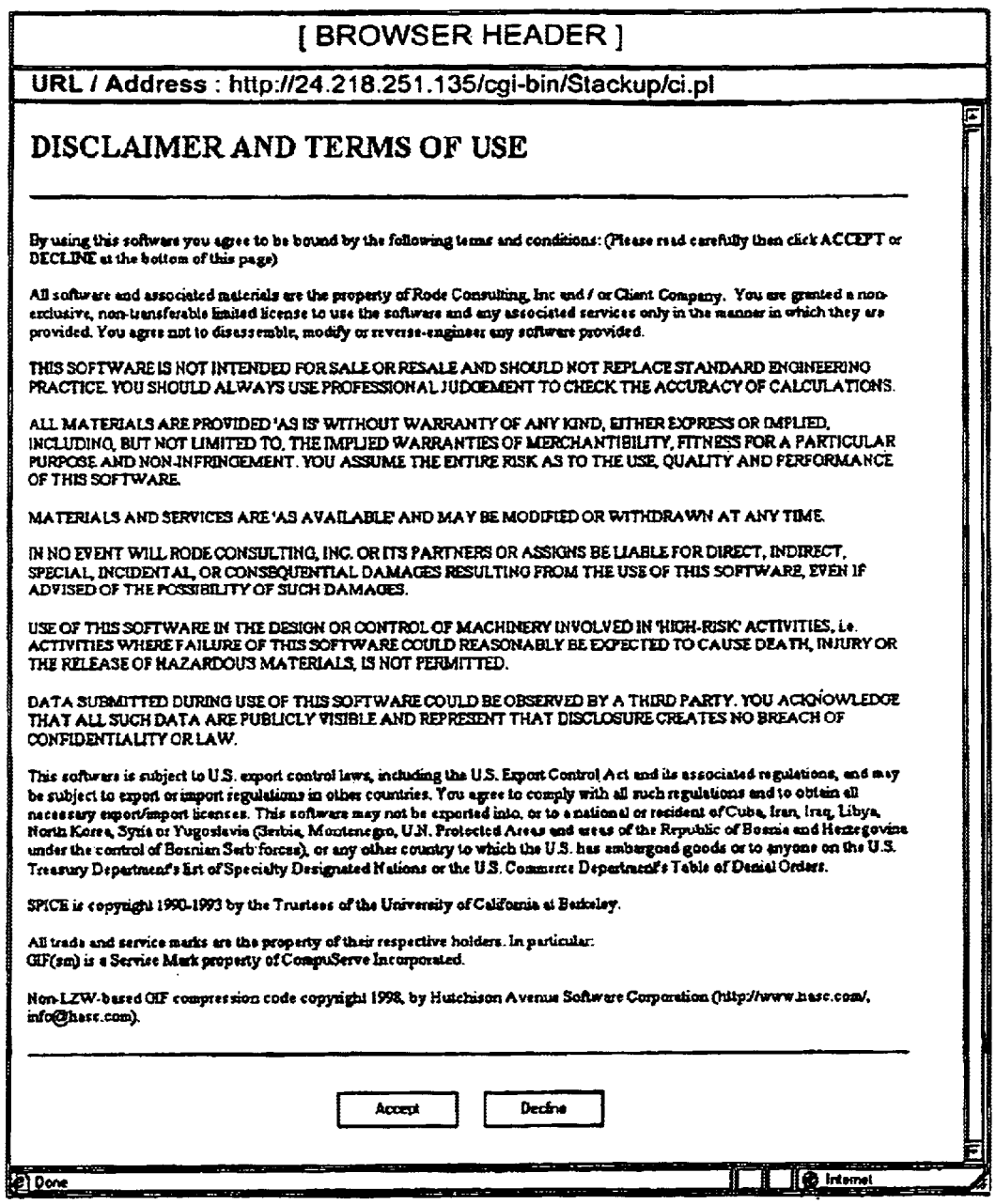

FIG. 1 UI: Disclaimer/Delay page

Figure 2A:
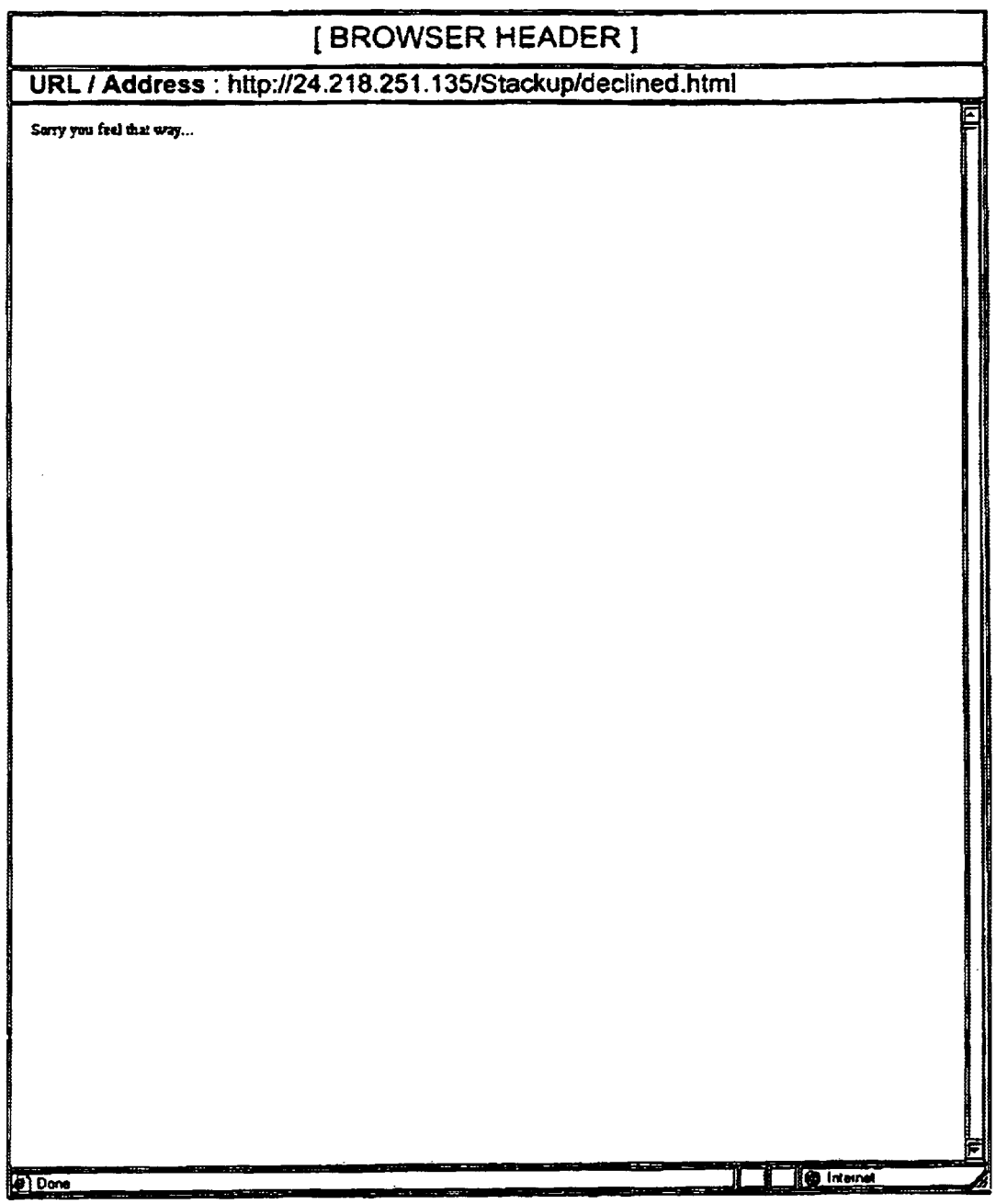

FIG. 2A UI: Terms Declined page

Figure 2B:
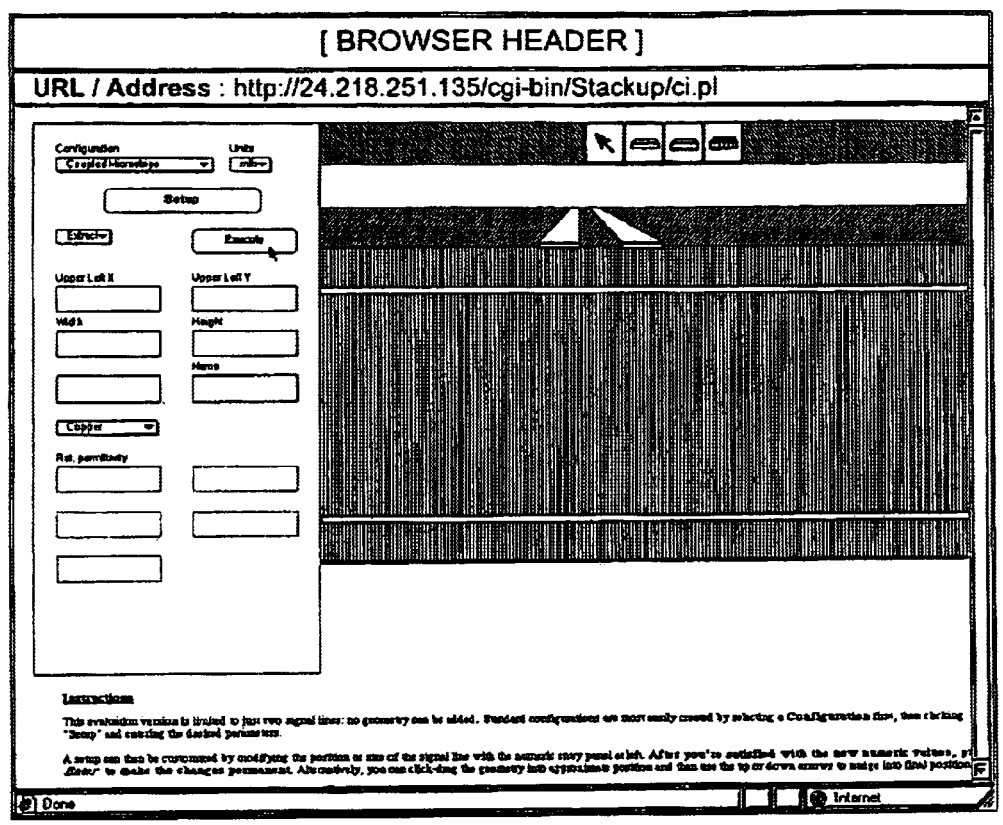

FIG. 2B UI: Sample user interface (account information has been successfully initialized)

Figure 3:
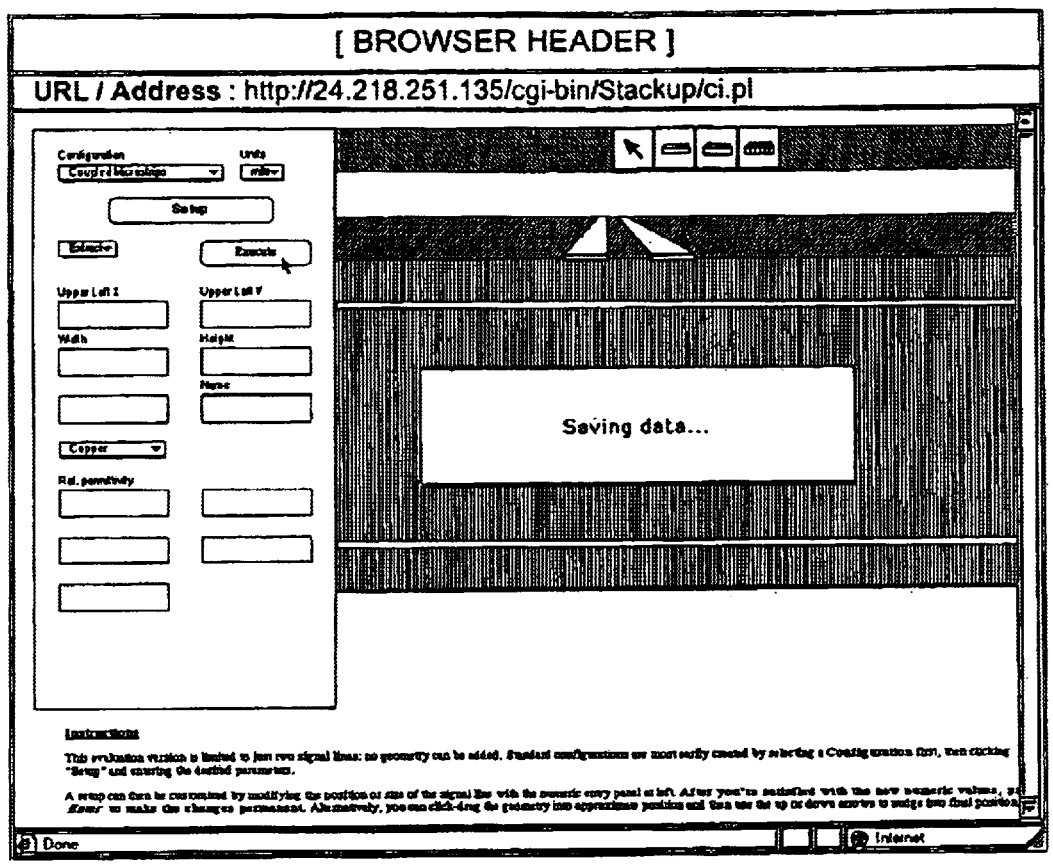

FIG. 3 UI: Sample user interface (data saved is being saved, to be followed by request for operation)

Figure 4A:
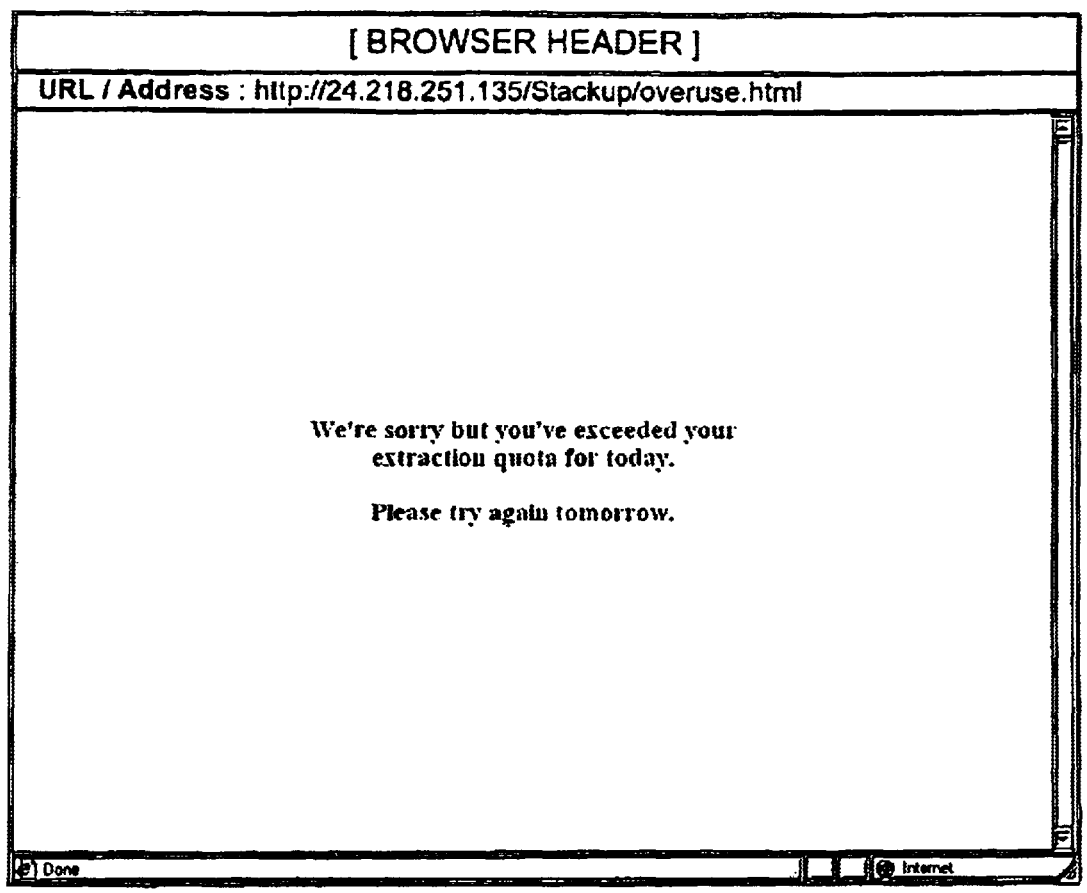

FIG. 4A UI: Usage limits exceeded, operation not performed

Figure 4B:
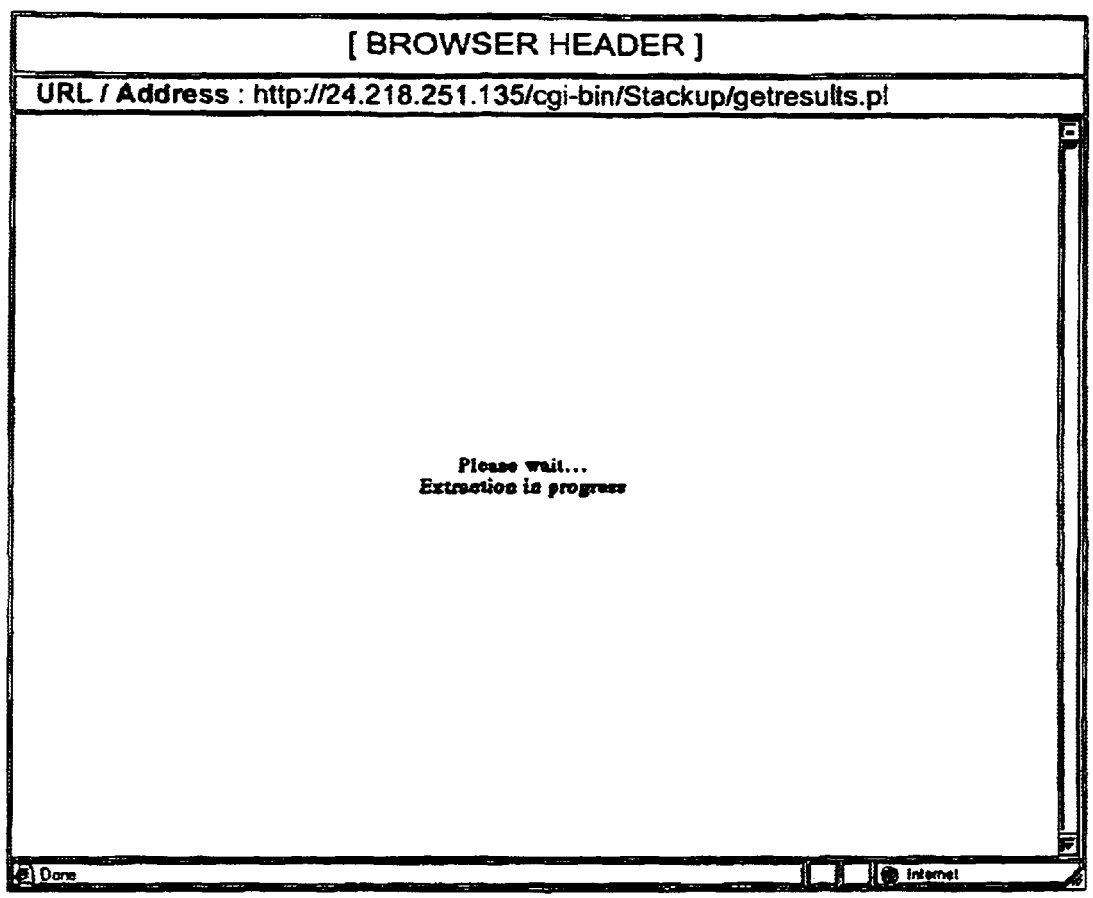

FIG. 4B UI: Account information successfully updated and within allowed limits, operation in progress . . .

Figure 5:
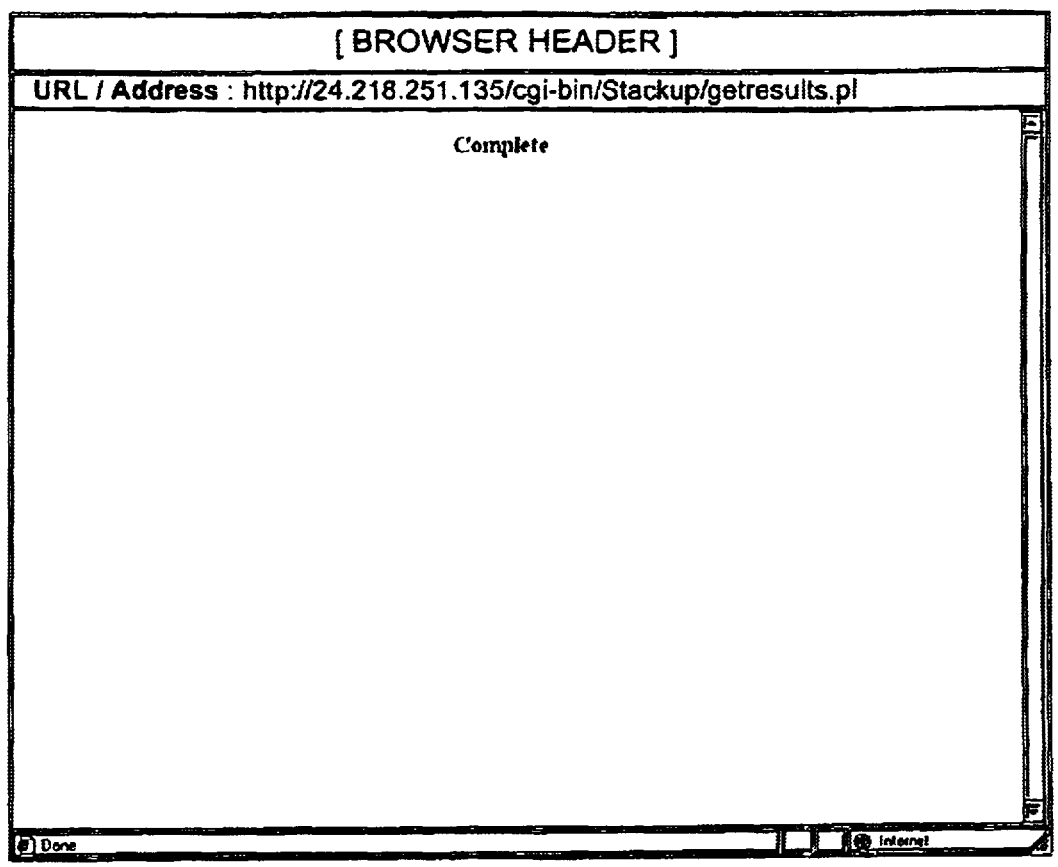

FIG. 5 UI: Operation complete

DETAILED DESCRIPTION OF THE INVENTION

Program listings for the methods here described are attached in the attached Listings, pages 1–17. These listings and the following description of the preferred embodiment may be phrased in terms of HTML, Java, Perl and HTTP, but straightforward conversion to other markup languages (including, but not limited to XHTML, XML, MathML, VRML, etc.) and programming languages is anticipated.

The present invention principally achieves its objective of semi-securely storing account information on the client by a mechanism that may be summarized as "pay-in-advance": In the preferred embodiment, an account "cookie" is maintained in the browser which is modified in advance of performing an action subject to account limit(s), rather than afterwards. To prevent the same cookie from being resubmitted, a timestamp is encoded in the cookie data that will expire within a few seconds of when the cookie is first sent to the browser (the few second limit is to allow for network congestion and possible user interaction in accepting the cookie. The (simplified) normal sequence is 1) request operation, 2) update account cookie as if operation had been completed, 3) redirect browser to new URL (which causes retransmission of cookie) 4) compare newly updated cookie against account and staleness limits, 5) if OK, process operation. It is possible that the operation could fail through no fault of the user, and in such case the account information could be credited to reflect such failure. Though this feature is not implemented in the attached listings, what is required is to simply decrement "usage" and send the adjusted cookie along with the failure notification page.

An example client user interface demonstrating the disclosed methods in the simplest case (Single Server, FIG. 0A) and using an HTTP and Java-compatible web browser is attached in the drawings (FIG. 1–5) and described below. The user interface happens to be that of a PCB impedance extractor, but the particulars of the computation to be performed and the user interface are irrelevant. The user interface appears essentially the same for all four illustrated embodiments (FIG. 0a–0d), although the underlying methods vary.

1) If the user has never visited before (i.e., has no valid account information), they are presented with a disclaimers/term of use page.
See FIG. 1 and FIG. 0A, step 0

2) If the user clicks "DECLINE" a regrets page is shown. See FIG. 2A (declined.html).
If the user clicks "ACCEPT", account information is initialized (in this example, such information is stored in a "cookie") on the client machine. See FIG. 0A, steps 1&2. If storage of the account information is not successful, the interface returns to 1).
If the account information is successfully initialized, the full user interface is shown. See FIG. 2B and FIG. 0A, step 3. The example interface uses a Java applet for user input with HTML output but which could be just as easily implemented using a purely Java, HTML or XML interface. This interface is composed of normal browser/applet elements (pull-down menus, buttons, text fields, etc.) and capabilities.

3) After the user has selected appropriate input settings, server computation is initiated. See FIG. 0A, step 4. In this example, "Execute" is clicked.
Data is saved on the server. An optional message, or messages is/are displayed while the data is saved. In this example, "Saving data . . . " is displayed in a dialog box and in the browser status line until the data has been successfully saved. See FIG. 3.

4) After the data is saved, a new page is displayed (in the preferred embodiment, this page is displayed/opened in a separate window) indicating that "Processing . . . " is taking place, accompanied by updated account information (in a "cookie") and an implicit ("refresh") request to direct the Client-User application to fetch a new page. See FIG. 4B and FIG. 0A, step 5.

5) The browser automatically fetches the new page implicitly communicated in the previous step while echoing the updated account information ("cookie") it received in the previous step. See FIG. 0A, step 6.
If the user's account information is invalid (missing, corrupt, inauthentic or obsolete), or the user has exceeded his quota for use of this resource, an error message (../../htmlStackup/overuse.html) is displayed and computation does not proceed. See FIG. 4A and FIG. 0A, step 7.
If the user's account information is present, complete, authentic and timely and the requested operation is within the limits allowed in the user's account information, the operation is actually performed. During this time, a message such as FIG. 4A may be displayed.

6) The results of the computation are saved in a local file and formatted for return and display to the Client-User. The results window is refreshable by the user without reinitiating computation, because the results have been saved in a file. See FIG. 5.

Though the fundamental mechanisms and user interface appear similar across the four embodiments diagrammed in FIGS. 0A–0D, there are underlying differences. All embodiments show a Primary (web) Server (although in reality, there could easily be a plurality of such servers) that performs the following steps of account initialization and transmission of the user interface data:

0) The Client-User directly retrieves the disclaimer/registration page, or attempts to retrieve a page containing an interface to a Computational Resource under control by disclosed Server methods, and is redirected to the disclaimer/registration page because of the lack of a valid account cookie.
Ordinarily, a disclaimer page serves only the legal function of informing a potential user of contractual obligations required to obtain access to the software used. In the preferred embodiment, however, such pages serve a second purpose as a "delay" page—a mechanism that requires the user to do something inconvenient in order to create a new account in those situations where Server access is not controlled by passwords or unique identification. If unique identification or passwords are used such delay may be unnecessary. The attached listings (acceptdecline.pl) demonstrate a mechanism of delaying 15 seconds, however, the delay is actually measured from when the disclaimer page was generated, rather than simply being fixed. To achieve this a timestamp ("token") is generated and transmitted with the disclaimer page with said timeslamp being returned when the form is submitted. This allows the disclaimer page to hide the download time of the applet—so the delay effectively runs concurrently with any download time (such as a large jar file).

1–3) If the Client-User submits the form via the Accept button, a new account cookie is created and transmitted in an HTTP header along with a Location: redirect to the user interface page (ci.pl, CrossSection.jar) for the controlled resource (in the attached diagrams, a 2D PCB Impedance Calculator). As mentioned above, a Client-User cannot directly access this page without a valid account cookie because said page is generated from a script that checks for the presence of a valid account cookie.
If the Client-User clicks Decline, they are forwarded to a regrets page and no account cookie is sent.

Once, an account cookie has been created and the user interface presented to the Client-User, subsequent steps differ between the 4 embodiments.

Embodiment 0A

In the preferred embodiment, a single web Server handles all transactions with the Client (although secondary graphics or advertising may be stored on Servers located elsewhere in the Internet). The Server contains methods to execute the following steps.

4) Once the Client-User has access to the computational resource interface, they may use it as any ordinary interactive interface (HTML, Java, JavaScript, etc.) up to the point where an operation is requested that uses a Server resource subject to limits controlled by the methods of the present invention. In that case, the data needed to complete the operation may be separately submitted via a CGI/RMI HTTP (etc.) form and saved in a temporary file (save.pl), identified by the unique ID stored in the account cookie.

5) A calculation using this saved data is then requested (calculate.pl). The Server returns a preliminary result page for this form submission that includes an updated account cookie and a redirection request (e.g. META REFRESH=) to the page that actually performs the calculation (getresults.pl). An "Operation in progress" message may optionally be part of this preliminary result page, and is, in fact, a reason this step is separate from the step that follows (getresults.pl).

Steps 4 and 5 (save.pl and calculate.pl) may be combined into a single step. In a pure HTML interface, this would be likely, however, the example interface uses a mixture of Java and HTML and so it is useful to separate file saving, for which access to cookies is not necessary, from computation, which requires that cookies be set. Java does not have a cookie mechanism, but some browsers have a connection between Java and JavaScript that allows Java applets to set cookies, and this is a possible alternative implementation.

6–7)The Client-User application acts upon the redirection request and fetches the named page (getresults.pl). The request is normally accompanied by updated account information from the previous step. If a results file already exists that corresponds to the updated account information, that results file is processed into a form suitable for display to the Client-User.

If a results file is not present, but the account information is present, valid, fresh (good timestamp) and indicates that the operation is within account limits, the operation is performed and a results file is created. Then the results file is processed as returned to the Client-User (as in the previous paragraph).

If a results file is not present, and the account information is missing, invalid or stale (bad timestamp) the operation is not performed and an optional error message is returned. If the account information is otherwise valid but indicates the user has exceeded their account limits, an overuse page is returned.

Embodiment 0B

This embodiment differs from Embodiment 0A in that the actual restricted computation is performed on a different server from the server communicating with the Client, that is, the primary Server accepts data and then chooses one-of-N (at least one) Private Computation Servers to execute the actual core computation. The primary Server script forwards (and may modify) all Client-submitted information to the one-of-N Private Computation Servers and forwards (and may modify) any results from Computation Server to Client. This difference between 0A and 0B occurs at step 7.

The algorithm by which the one-of-N servers is chosen is a known art, and may be a simple round-robin selection, or a round-robin whereby busy servers are skipped over in favor of the next available server.

In the illustrated example, the original implementation consisted of two different Servers. The primary server was running just a web server, the other was running a web server plus a field extraction CAD package. Account management was performed by the Primary Server with the computationally intensive field extraction performed on the second server. The information was packaged by the Primary Server into a form and submitted via an HTTP POST mechanism to a CGI script running on the second (computation) Server. That second server script converted the form data into a batch job for the CAD package and returned (formatted) results to the Primary (web) Server. Additionally, because the second Server could only perform one extraction at a time, the Primary Server contained methods that used semaphores to sequentially process a multiplicity of simultaneous, independent Client-User requests.

Embodiment 0C

This embodiment also differs from Embodiment 0A in that the actual limited computation is performed on a different server from the primary Server, but also differs from Embodiment 0B in that both the Primary Server and each Computation Server are visible to, and communicate with the Client. Embodiment 0C differs from 0A and 0B at step 7.

In embodiment 0C, Client-User data is forwarded to one-of-N computation servers chosen by possibly similar means and possibly similar mechanisms as in 0B, but then the Client-User application is forwarded to retrieve results directly from the selection computation server. This requires that each computation server have methods for communicating with the Client (e.g. must be a web server), and must have methods to reformat computation results for display on Client . An additional method not present in 0A or 0B must exist—the Client is authenticated to the Computation Server by a match between the Client-User account information and the data that was separately forwarded from the Primary Server and stored on the selected Computation Server.

Embodiment 0D

The topology for this embodiment is identical to 0C and as with 0C the actual limited computations are performed on separate Computation Server(s) that are visible to, and communicate with, the Client. Embodiment 0D differs from 0A, 0B and 0C at step 4–7. More than just computation is offloaded to each Computation Server in embodiment 0D.

In embodiment 0D, when the client submits calculation data (step 4), the Primary Server forwards that request to one of the N Computation Servers, chosen by means (e.g. round-robin) similar to 0B and 0C. All further processing is performed by the Computation Server (as per 0A, steps 5–7), including methods for 1) accepting and storing the Client data directly from Client 2) authenticating and updating the Client-User account information.

3) checking updated Client-User account information to make sure requested operation is within limits.

4) (optionally) formatting Client data for processing and post-processing data for display by Client-User application.

A hybrid between 0C and 0D is possible in which steps 4 and 5 are identical to 0C, but then the Primary Server forwards the saved Client data to the chosen one-of-N Computation Servers, which authenticates the updated account information and performs the requested operation.

What is claimed is:

1. A method of limiting server use by a client, said method comprising the steps of:
    client transmitting a request for a file or action (script) to a server, said request accompanied by valid client-stored server resource utilization information;
    said server examining said client-stored server resource utilization information and redirecting said client to a new file or action (script) accompanied by new client-stored server resource utilization information;
    said client transmitting a new request for said new file or action (script), accompanied by one of i) the said new client-stored server resource utilization information, ii) the original client-stored server resource utilization information or iii) no client-stored server resource utilization information;
    said server verifying that said client-stored server resource utilization information accompanying said new request is the said new client-stored server resource utilization information and verifying that said client-stored server resource utilization information accompanying said new request is within acceptable limits to proceed with said new request;
    if said verification completely successful, said server fulfilling either i) said client request or ii) said client new request;
    if said verification unsuccessful, said server not fulfilling said client requests and optionally returning error status to said client.

2. A method of limiting server use by a client, said method comprising the steps of:
    client transmitting a request for a file or action (script) to a server, said request not accompanied by valid client-stored server resource utilization information;
    said server determining that said request not accompanied by said valid client-stored server resource utilization information and redirecting client to a new file or action (script) accompanied by valid client-stored server resource utilization information after a human-significant (>1 second) delay;
    said client transmitting a new request for said new file or action (script), accompanied by one of i) the said new client-stored server resource utilization information, ii) the original client-stored server resource utilization information or iii) no client-stored server resource utilization information;
    said server verifying that said client-stored server resource utilization information accompanying said new request is the said new client-stored server resource utilization information and verifying that said client-stored server resource utilization information accompanying said new request is within acceptable limits to proceed with said new request;
    if said verification completely successful, said server fulfilling either i) said client request or ii) said client new request;
    if said verification unsuccessful, said server not fulfilling said client requests and optionally returning error status to said client.

3. A method of limiting server use by a client, said method comprising the steps of:
    client transmitting a request for a file or action (script) to a server, said request not accompanied by valid client-stored server resource utilization information;
    said server determining that said request is not accompanied by said valid client-stored server resource utilization information and redirecting client to a form accompanied by valid client-stored server resource utilization information, said form containing information about said client's said request;
    a user of said client completing said form and submitting to said server, accompanied by one of i) the said new client-stored server resource utilization information, ii) the original client-stored server resource utilization information or iii) no client-stored server resource utilization information;
    said server verifying that said client-stored server resource utilization information accompanying said submitted form is the said new client-stored server resource utilization information and verifying that said client-stored server resource utilization information accompanying said new submitted form is within acceptable limits to proceed with said request;
    if said verification completely unsuccessful, said server not fulfilling either i) said client request or ii) said client new request;
    if said verification unsuccessful, said server not fulfilling said client requests and optionally returning error status to said client.

4. The method of claim 1, 2 or 3, comprising the additional step of:
    said server returning said error status accompanied by further modified client-stored server resource utilization information, said further modified client-stored server resource utilization information reflecting a "credit" for that portion of the requested operation not completed.

5. The methods of claim 1, 2, or 3, where additionally all client-stored server resource utilization information is i) encoded before transmission to said client by means obscure to said client or ii) encrypted using a key not known to nor discoverable by said client, or iii) both i) and ii).

6. A method of limiting server use by a client, said method comprising the steps of:
    client transmitting a request for a file or script from a server;
    said server requesting server resource utilization information from said client;
    said client transmitting said server resource utilization information;
    said server modifying said server resource utilization information and transmitting said modified server resource utilization information to said client;
    said client optionally replacing original state information with said modified server resource utilization information;
    said server requesting server resource utilization information from said client;
    said client transmitting either said modified server resource utilization information or some other server resource utilization information;
    said server verifying that said server resource utilization information is the modified server resource utilization information and verifying that said modified server resource utilization information is within acceptable limits to proceed with said request;
    if said verification successful, said server fulfilling said client request;

if said verification unsuccessful, said server not fulfilling said client request and optionally returning an error message or redirecting said client to request an error message file.

7. The methods of claims 1, 2, 3, or 6, where said new client-stored server resource utilization information additionally contains a timestamp, said timestamp being used by said server to determine if said new client information has been recently updated and said server rejecting as invalid any said new client information that is deemed too old and declining to fulfill said client request or said new client request.

8. A computer readable medium, containing executable program instructions comprising at least one of the methods of claims 1, 2, 3, or 6.

* * * * *